United States Patent Office 2,899,358
Patented Aug. 11, 1959

2,899,358

BLOOD ANTICOAGULANT COMPOSITION AND PROCESS

Nathan Sperber, Bloomfield, N.J., assignor to Schering Corporation, Bloomfield, N.J., a corporation of New Jersey No Drawing. Application February 23, 1956
Serial No. 567,066

3 Claims. (Cl. 167—65)

This invention relates to pharmaceutical preparations possessing anticoagulant activity.

More specifically, the present invention relates to compositions containing lower alkoxy phenylindandiones which characteristically induce a marked hypoprothrombinemic action.

The differences in the physiological properties between the known anticoagulant drugs used in the treatment of thromboembolism as compared with the properties of an ideal hypothrombinemic drug have left much to be desired. Compounds of the coumarin class have received wide application; and ethyl biscoumacetate and bishydroxycoumarin have been used for many years. The disadvantages of these drugs are well known to those skilled in the art. For example, ethyl biscoumacetate has been shown to have an erratic response, making it difficult to maintain the condition of the blood always within the therapeutic range, and most important, an inadequate duration of activity. Furthermore, the variability in response has made evaluation difficult (Gruber et al., Arch. Int. Pharmacodyn., XC, No. 4, p. 488 (1952)). Thus, because of the non-uniformity of response that has been reported for bishydroxycoumarin, the dosage must be carefully determined for each individual; and because of the further circumstance that the period of activity of such compound is usually excessively long, greater difficulty is experienced in fixing the dosage and in ascertaining just when therapy should be halted in order to prevent spontaneous hemorrhage.

Recently there have been made available compounds, such as phenylindandione, which have been reported to exert a hypoprothrombinemic action of a quality similar to that of the coumarin drugs but having certain advantages. The main advantages of phenylindandione are its rapid onset of anticoagulant action as compared with the coumarin types, its shorter duration of activity as compared with bishydroxycoumarin and its noncumulative effects.

I have found that certain derivatives of phenylindandione exhibit improved anticoagulant properties without a decrease in therapeutic index and that, in general, certain substitutions by a non-toxic radical in the para position of the 2-phenyl group improve the physiological properties of the phenylindandione. This is surprising in the light of the known fact that substitution in the benzene ring of the indandione portion of the molecule generally results in deactivation of the compound.

According to the present invention, anticoagulant preparations are made with or consist of phenylindandiones selected from the group consisting of mono-alkoxy phenylindandiones, or their enolic non-toxic metal salts, and especially the alkali and alkaline earth metal salts, like the sodium, potassium, calcium and magnesium salts.

The present invention accordingly provides new and improved anticoagulant preparations containing as an essential ingredient one of the tautomeric compounds of the general formulae:

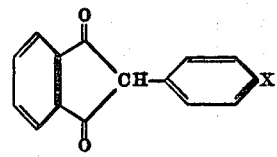

and

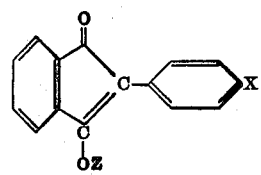

wherein X is a member of the class consisting of alkoxy, such as methoxy, ethoxy, isopropoxy and other lower alkoxy groups, and Z is a non-toxic metal, like Na, K, ½ Ca, ½ Mg, etc.

Anticoagulant preparations made according to the present invention were tested for oral anticoagulant activity in rabbits and prothrombin times estimated, in accordance with the procedure of Jacques (Transactions of Frst Conference on Blood Clotting and Allied Problems, p. 168 (1948)). Phenylindandione was employed to standardize the test animals, and rabbits exhibiting a clotting index (Campbell et al., J. Biol. Chem., 138, 1, (1941)) of 0.3–0.5 with an oral dose ranging from 4 to 5 mg./kg., t.i.d., were considered sufficiently sensitive to be used for screening or assay purposes. The compounds to be tested were administered t.i.d., orally, either in aqueous suspension or solution by stomach tube with the activity and clotting index being calculated according to the procedure described by Campbell (loc. cit.). In brief, the tests were run as follows: Normal plasmas were obtained from each test animal immediately preceding administration of the first dose of the drug. The first pathic plasma sample was generally taken twenty hours after the initial dose and compared with the normal plasma as quickly as possible. A second pathic plasma sample was obtained approximately 44 hours after the first drug dose, and if increased clotting times were still evident, daily samples were taken until the prothrombin time had returned to normal (that is, clotting index equal to 1). It was found that the compounds of my invention have reaction onset times that are at least as rapid as that of phenylindandione which has been reported to have the most rapid onset of any of the oral anticoagulant drugs. Furthermore, the duration of action of the compounds of this invention was found to be greater than that of phenylindandione, but advantageously shorter than that exhibited by the coumarin drugs. This desirable duration of activity has a marked advantage over phenylindandione in that one daily therapeutic dose is sufficient to maintain the proper clotting index, while phenylindandione must be administered, generally, 2 to 3 times daily to maintain a suitable prothrombin time. Moreover, the 4'-substituted compounds do not cause chromaturia as does the phenylindandione. This is an important physiological advantage, as it is generally difficult for the physician to determine whether the red color is due to the medicinal agent or to the presence of blood (hematuria). The prevention of the appearance of the deep red color which appears in the urine of patients on phenylindandione therapy is obviously most desirable.

The compounds of the present invention are preferably prepared by the alkaline rearrangement of a benzalphthalide (obtained from the reaction of phthalic anhydride with a substituted phenylacetic acid) as illustrated in the following equations:

(1)
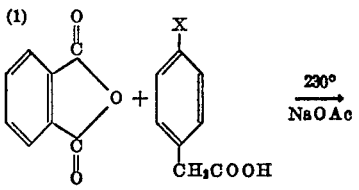

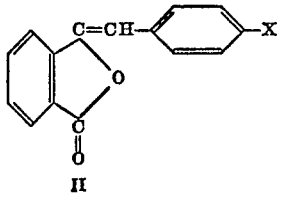

II

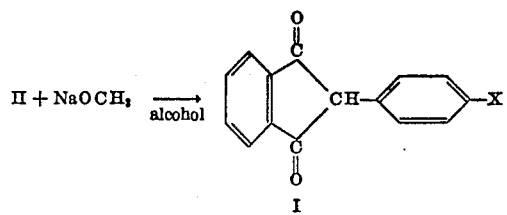
I

The initial condensation of phthalic anhydride with a substituted phenylacetic acid, with simultaneous decarboxylation resulting in the formation of a benzalphthalide (II), is conveniently effected by heating the reactants above 200°, preferably in the presence of a basic catalyst. Treating the benzalphthalide in alcoholic solution with sodium alkoxide causes rearrangement, and upon acidification, there is obtained the desired phenylindandione (I). In some cases, the phenylindandione exists in one of its tautomeric forms and is easily transformed into its other tautomer by recrystallization from a suitable solvent.

In addition to the procedure described in Equation 1, other methods can be employed in the preparation of the compounds of this invention. For example, condensing phthalide with a substituted benzaldehyde in the presence of a basic catalyst such as sodium methoxide yields the phenylindandione of choice, as illustrated in the following equation:

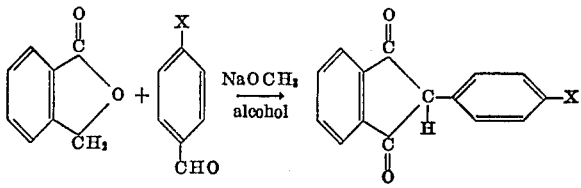

I have also prepared the compounds of general Formula I by the base-catalyzed condensation of diethyl phthalate with a substituted phenylacetic ester, as illustrated in the following equation:

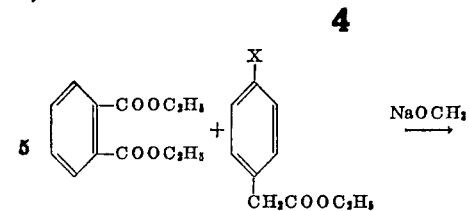

Other reaction sequences which are applicable to the preparation of compounds of this invention are illustrated in the following:

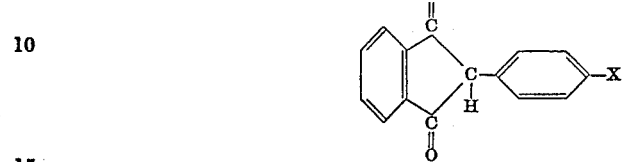

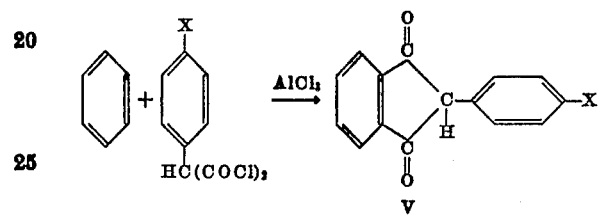
V

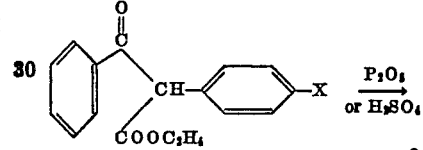

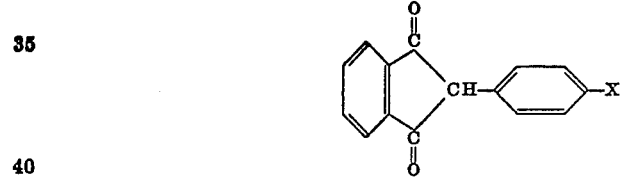

According to the above equations, by reacting benzene with a 4-alkoxy-phenylmalonyl chloride in the presence of aluminum chloride, according to usual procedures, one obtains the corresponding 4-substituted phenylindandione (V). Finally, as illustrated in Equation 6, an alpha-benzoylphenylacetic acid ester can be cyclized to a phenylindandione by treatment with a dehydrating agent such as phosphorus pentoxide or concentrated sulfuric acid.

The following examples are illustrative of the procedures employed in preparing the compounds of this invention but are not to be construed as limiting the scope thereof; the scope of the invention being limited only by the appended claims.

EXAMPLE I 2-(p-methoxyphenyl)-1,3-indandione

METHOD A

To a hot solution of 20.6 g. of sodium in 400 ml. of absolute ethanol, there is added a solution of 110 g. of phthalide and 110 g. of p-methoxybenzaldehyde. A vigorous reaction ensues and one-half of the alcohol is distilled off over a two-hour period. Ice and water are added to the red solution and the diluted solution is acidified with hydrochloric acid. The resulting gum solidifies and the aqueous phase is removed by decantation. The crude solid is recrystallized twice from two liters of ethanol yielding 2-(p-methoxyphenyl)-1,3-indandione as pale yellow crystals, M.P. 155–156° C.

METHOD B

The requisite intermediate, 1-p-methoxybenzalphthalide, is prepared as follows: A mixture of 400 g. of phthalic anhydride, 400 g. of p-methoxyphenylacetic acid, 1.2 g. of anhydrous sodium acetate and 1 g. of anhydrous potassium acetate is heated at 260–270° for two and one-half to three hours. (The evolution of carbon dioxide and water may cause some foaming at this stage.) The reaction mixture is poured on a tray, cooled and the resultant solid pulverized.

In a five-liter 3-necked flask, fitted with stirrer, reflux condenser and dropping funnel, there is placed 2 l. of methanol and 637 g. of crude 1-p-methoxybenzalphthalide. To the stirred suspension is added a solution of 225 g. of sodium methoxide in 1.7 l. of methanol and the resulting dark red solution is refluxed for one and one-half hours. Fifteen hundred milliliters of methanol is distilled off and the red solution is poured on ice and water, acidified with concentrated hydrochloric acid, and the resulting solid is filtered and washed with water. Following two recrystallizations from benzene-hexane 2-(p-methoxy-phenyl)-1,3-indandione is obtained as a pale yellow, crystalline solid, M.P. 156–157° C.

EXAMPLE II

2-(p-ethoxyphenyl)-1,3-indandione

To a solution of 6.8 g. of sodium dissolved in 225 ml. of absolute ethanol there is added a hot mixture of 40 g. of p-ethoxybenzaldehyde and 35.7 g. of pthalide. The deep red solution which forms is refluxed for one-half hour, cooled and poured into 100 ml. of water. The solution is concentrated in vacuo and the thick red gummy residue is taken up in water and extracted in ether. The aqueous layer is acidified with concentrated hydrochloric acid to yield a gummy red solid. The supernatant liquid is removed and the gum is triturated with 95% ethanol to precipitate an orange solid which is removed by filtration and washed with cold ethanol. After recrystallization from a large volume of ethanol, 2-(p-ethoxyphenyl)-1,3-indandione is obtained as yellow needles, M.P. 148–149° C.

EXAMPLE III

2-(p-n-propoxyphenyl)-1,3-indandione

By reacting 30.0 g. of p-n-propoxybenzaldehyde with 24.5 g. of phthalide in a solution of 4.7 g. of sodium in 200 cc. of absolute ethanol, according to the procedure described in Example II, 2-(p-n-propoxyphenyl)-1,3-indandione, M.P. 131–132° C., is obtained in the form of pale yellow crystals, following recrystallization from absolute methanol.

EXAMPLE IV

2-(p-isopropoxyphenyl)-1,3-indandione

This compound is prepared by adding a warm mixture of 32.8 g. of phthalide and 40 g. of p-isopropoxybenzaldehyde to a solution of 6.1 g. of sodium in 200 ml. of absolute alcohol. The reaction mixture is processed by the procedure described in Example II and, after several recrystallizations from absolute methanol, 2-(p-isopropoxyphenyl) - 1,3 - indandione is obtained, M.P. 122–123° C.

EXAMPLE V

2-(p-butoxyphenyl)-1,3-indandione

By reacting a warm mixture of 71.4 g. of phthalide and 96 g. of p-n-butoxybenzaldehyde in a solution of 13.6 g. of sodium in 500 ml. of absolute ethanol, according to the procedure described in Example II, 2-(p-n-butoxyphenyl)-1,3-indandione is obtained as a pale yellow solid, following several recrystallizations from methanol.

The compounds of the present invention can be incorporated in various pharmaceutical preparations, such as tablets and suppositories by mixing the same with a suitable proportion of a non-toxic pharmaceutical carrier such as starches, gums, sugars, talc and the like in the case of suppositories. The compounds can be administered also intravenously, preferably in the form of aqueous solutions of their non-toxic metal salts, preferably their sodium salts, the solutions being rendered isotonic by the use of common salt, sugar or any other known ways. The initial dosage is from about 200 to 400 mg. daily, followed by 50 to 250 mg. per day as a maintenance dose. This dosage, however, may be varied, depending upon the requirements of the patient.

The proportions of active ingredient in my compositions can be varied over a substantial range, subject to the practical limitation that a sufficient proportion of active ingredient be present to provide a suitable dosage. Obviously, the conventional practice of adminstering several unit dosage forms at about the same time can be followed. Ordinarily, the proportions of active ingredient will comprise from about 10% to about 25% by weight of the tablet. I have found that tablets containing from about 25 mg. to about 250 mg. of active ingredient are particularly suitable. However, proportions of active material outside this range can obviously be employed. The following formulations are intended as illustrative only and are not to be construed as limiting the scope of the invention.

EXAMPLE VI

| | Mg. |
|---|---|
| 2-(p-methoxyphenyl)-1,3-indandione | 50.0 |
| Lactose | 189.7 |
| Corn starch | 63.1 |
| Amijel (partially hydrolyzed corn starch) | 18.2 |
| Potassium phosphate monobasic | 1.0 |
| Stearic acid | 3.0 |

The lactose and corn starch are mixed, then granulated with the partially hydrolyzed corn starch. Potassium phosphate and 2-(p-methoxyphenyl)-1,3-indandione are added. Stearic acid is mixed in, and the composition is tableted.

EXAMPLE VII

| | Mg. |
|---|---|
| 2-(p-methoxyphenyl)1,3-indandione | 25.0 |
| Citric acid | 75.0 |
| Lactose | 90.0 |
| Corn starch | 41.3 |
| Gelatin | 3.0 |
| Magnesium stearate | 2.0 |

The lactose, corn starch and citric acid were admixed and granulated. 2-(p-methoxyphenyl)1,3-indandione is added, followed by the addition of gelatin and magnesium stearate. The composition is then tableted.

The compound of Example I has been used clinically with very good results in the treatment of various blood-circulatory and vascular diseases, including coronary occlusions, embolisms, phlebitis, and rheumatic heart disease conditions such as auricular fibrillation.

A representative case history from the clinical investigations of the compounds of this invention is set forth below:

*Case A.*—The patient was a 43-year-old female, with a diagnosis of auricular fibrillation due to mitral stenosis. Administration of 2-(p-methoxyphenyl)1,3-indanione was begun following embolectomy. The patient received an initial dosage of 400 mg. and was satisfactorily maintained at a dosage of 100 mg. every two days. The prothrombin time reached therapeutic level in 48–72 hours. After 37 days of therapy, the patient was discharged, with no history of complications.

This application is a continuation-in-part of my copending application, Serial No. 412,119, filed Feb. 23, 1954.

Having disclosed my invention what I claim to be new and wish to secure by Letters Patent is:

1. A blood anticoagulant composition in dosage form comprising a solid pharmaceutically acceptable carrier and from about 25 mg. to about 250 mg. of 2-(p-methoxyphenyl)-1,3-indandione.

2. A blood anticoagulant composition in tablet form comprising a solid pharmaceutically acceptable carrier and from about 25 mg. to about 59 mg. of 2-(p-methoxyphenyl)-1,3-indandione.

3. A process for lowering the blood prothrombin level of the blood in human beings and thus combatting clotting in vivo which comprises administering to a living human being a blood anticoagulant composition comprising 2-(p-methoxyphenyl)-1,3-indandione and a pharmaceutically acceptable carrier and regulating the amount of such composition so administered as indicated by measurement of blood protrombin levels so as to avoid too great a lowering of said level whereby hemorrhage is avoided.

References Cited in the file of this patent

UNITED STATES PATENTS

| 2,601,308 | Lovas | June 24, 1952 |
| 2,672,483 | Thomas | Mar. 16, 1954 |
| 2,820,738 | Litvan | Jan. 21, 1958 |

OTHER REFERENCES

Koelsch: J.A.C.S., 58, 1936, pp. 1329–1333.
Berger: Med. Chem., vol. I, 1951, p. 264.